United States Patent [19]  [11] 4,271,479
Cheselka et al.  [45] Jun. 2, 1981

[54] DISPLAY TERMINAL WITH MODULARLY ATTACHABLE FEATURES

[75] Inventors: Harry Cheselka, Saugerties; William F. Nemecek, Kingston; Dean A. Stockwell, Albany, all of N.Y.

[73] Assignee: International Business Machines Corporation, Armonk, N.Y.

[21] Appl. No.: 844,151

[22] Filed: Oct. 20, 1977

[51] Int. Cl.³ .............................................. G06F 9/18
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,071,753 | 1/1963 | Fritte et al. | 364/900 |
| 3,659,271 | 4/1972 | Collins et al. | 364/200 |
| 3,668,649 | 6/1972 | Pederson et al. | 364/200 |
| 3,725,871 | 4/1973 | Heuttner et al. | 364/200 |
| 3,740,725 | 6/1973 | Fletcher et al. | 364/200 |
| 3,830,962 | 8/1974 | Mailloux | 364/900 |
| 3,956,739 | 5/1976 | Ophir et al. | 364/200 |
| 4,025,905 | 5/1977 | Gorgens | 364/900 |
| 4,051,457 | 9/1977 | Inose et al. | 364/900 |
| 4,064,561 | 12/1977 | Jennings | 364/900 |

Primary Examiner—Gareth D. Shaw
Assistant Examiner—C. T. Bartz
Attorney, Agent, or Firm—Frederick D. Poag

[57] ABSTRACT

Disclosed is a display system having one or more display terminals, each of which includes a base unit which acts as a display and supports a keyboard for operation as a keyboard/display terminal, the terminal in turn interfacing with a plurality of features connected thereto. The features can be quite independent of the display, such as a card reader, or can be an operationally integral part thereof, such as extended capacity buffer operating jointly with the main buffer of the display, or can be interactive with the display, such as a selector pen or program function keyboard. The base unit and the features receive transmissions from a controller via a feature bus-out in the base unit and transmit to the controller via a feature bus-in in the base unit. The base unit also provides priority control in permitting features to respond to a controller poll. Commands are also directly addressable to the base unit and features by the controller, with the base unit performing interface functions between the controller and the features such as parity checking and time out error reporting.

10 Claims, 9 Drawing Figures

DISPLAY TERMINAL WITH MODULARLY ATTACHABLE FEATURES

BACKGROUND OF THE INVENTION

1. Field of the Invention

This invention relates to data display systems and more particularly to a display terminal which provides the architecture and electrical interface for the attachment of feature devices to expand the capability of the terminal in a modular fashion.

2. Description of the Prior Art

Display systems are known which include optional accessories such as a card reader, and light pen. These features are interfaced to the display by individually specialized logic, and whenever an additional feature is required, an additional interface is required. Some systems include special features, such as graphics and special effects capabilities which are built into the display unit. Other prior art systems make use of a system bus, with a microprocessor, a display unit with a keyboard, and other units such as auxiliary storage, etc., connected to the bus.

Prior art systems of the kind described have built-in, relatively tailor made characteristics whereby the tendency is to design and build various separate models for different employments.

SUMMARY OF THE INVENTION

In contrast, in the present invention, the features depend from busses within the base unit of the display, not the controller processor system bus.

In accordance with one aspect of the invention, a terminal unit includes a base unit and feature units attachable thereto, the base unit having an input-output interface for connection to a controller, a bus-out and a bus-in connected to the interface, means responsive to transmissions from the controller on said bus-out variously according to whether they are in the nature of a general poll or contain an address, base priority means responsive to the status of the base unit and means responsive to the base priority means to effect transmissions to the bus-in. Further, each of the feature units comprises input and output interfaces connected to the base unit bus-out and bus-in respectively, means responsive to transmissions on the bus-out containing the address of the feature, and feature priority means responsive to the base priority means to effect transmissions to the bus-in.

According to another aspect of the invention, a terminal unit for use in a display system comprises a base unit, a keyboard unit, and features depending from the base unit. The base unit includes serializer, deserializer, input/output means for connection to a controller via a serial bit transmission means; a bus-out and a bus-in for transmission of information between the input-output means and each of the base unit, keyboard unit, and features; base command decode and execution means; address decoder means for gating commands from the bus-out selectively to the base unit or the keyboard; data storage and utilization means; the base command execution means being operative as a base selector means for directing data between bus-out and the data storage and utilization means, and vice versa, base status means for signalling the state of the base unit to the bus-in; keyboard selector means including keyboard status means for connecting the keyboard to the bus-in; and base-keyboard priority means responsive to base status and keyboard status for controlling transmissions of all elements of the base unit and the keyboard to bus-in. In accordance with a further aspect of the invention, the feature units each have information interfaces connected to the bus-in and bus-out and priority controls connected to the base-keyboard priority means, and feature command decoder and execution means, feature address decoder means, data storage and utilization means and feature status means.

Accordingly, it is the primary object of the invention to provide a display terminal having improved flexibility and adaptability to a variety of user requirements.

Another object of the invention is to permit a basic keyboard/display unit to be simple and low cost and yet to be expandable by means of features to include many functions not included in the basic unit, at the option of the user and as additional functions are developed.

Still another object of the invention is to provide a base unit as aforesaid which allows direct response by features to a general poll from a system controller under a common priority arrangement, further enhancing the efficiency of the polling procedure.

Another object of the invention is to provide features as aforesaid each having their own address decoder, command decoder, etc., whereby a large number of functions can be provided in the total system while keeping the basic unit relatively simple.

Thus an overall objective is to provide a display terminal system which is highly flexible and can be produced at minimum cost for the features desired.

The foregoing and other objects, features and advantages of the present invention will be apparent from the following description of a preferred embodiment of the invention as illustrated in the accompanying drawings.

DETAILED DESCRIPTION
SYSTEM OVERVIEW

Figure 1:
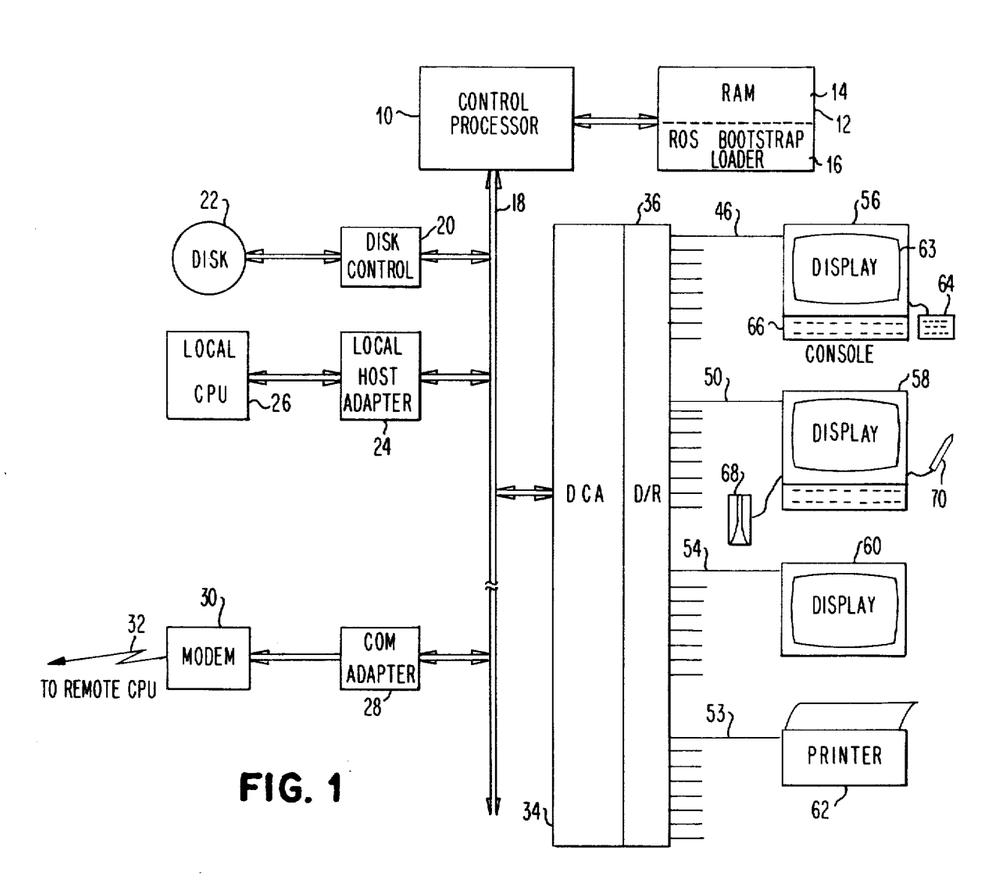
FIG. 1 is a diagram of a system including a host computer, a display controller, and a plurality of display units, in which the improved display unit of the invention can be employed advantageously.

FIG. 1 shows an interactive information handling system configuration including improved input/output apparatus in accordance with the invention. In the illustrated configuration, a CONTROL processor 10 has a natively attached memory 12 including a random addressable read/write storage (RAM) 14 and a read only storage (ROS)16. The programmed I/O bus 18 of the control processor connects to a disk control 20 by which programs be loaded from a disk 22 via bus 18 and processor 10 to working program storage in 14 under the control of bootstrap loader routines in ROS 16. Bus 18 is shown as a single cable, but may be partitioned into control and data sections in the manner of U.S. Pat. No. 3,996,564. That patent relates to a processor adapter organization broadly suitable for the present system.

Programs so loaded desirably contain not only working instructions for processor 10, but also code conversion tables and the like to be utilized by the system to convert codes from one form to another, as will be described hereinafter. Desirably, disk 22 is removable and is replaceable with other disks so that various program segments and tables can be read from source disks by control 20 into RAM 14 to assemble a program and table configuration appropriate to the employments contemplated for the given system and the characteristics of the various terminal devices to be employed therewith. Also, it is preferred that disk control 20 be capable of both reading from and writing to a disk 22 so that such a program and table configuration, once assembled, can be written onto a disk 22 for use in expedited initialization of the system whenever power is brought back up after a shut down. Thus, although RAM 14 may require rewriting after such a power shut down, loading of the selected program and table material from disk 22 to RAM 14 can be carried out expeditiously. This allows personalization of the system according to the user's needs and reconfiguration thereof by the user whenever desired.

Upstream communication is provided by a local computer adapter 24 to a local computer 26, and/or via a communication adapter 28 and a modem 30 to a communication line 32 extending to a remote computer. Either the remote computer or the local computer 26 can act as a host providing application program direction to processor 10, as is well known in the art.

For supporting the input/output devices in accordance with the invention, a device control adapter 34 is connected for communication with programmed I/O bus 18 for assembling and controlling the transmission of messages between processor 10 and a driver/receiver module 36 which supports a series of serial transmission links such as coaxial cables or lines 46-54 each providing two-way communication with a respective input, output or input-output device. For this purpose, module 36 contains an individual driver-receiver circuit for each line 46-54, and adapter 34 acts to poll-multiplex amongst those circuits when in drive (or transmit) mode and to address them individually when in receive mode.

Two keyboard-display stations 56, 58, a display-only station 60 and a printer 62 are shown representative devices for inclusion in such a system. Station 56 operates as a system console, and like keyboard display station 58, includes a cathode ray tube display 63 and a keyboard 66. The displays and printer 60 serve to output information from the system and the keyboards serve to input information and operator direction to the system. Other information and control inputting devices such as a program function keyboard 64, magnetic stripe card reader 68 and a light pen 70 provide data input and control to the system, in addition to or in lieu of keyboard 66.

A uniform interface between the I/O devices supported by adapter 34 and the system in which they serve is provided for facilitating their attachability to the system in a flexible manner. In the illustrated embodiment, all signals between driver/receiver module 36 and display stations 56, 58 and printers 60 are via the respective coaxial cables 46, 50, 53, 54 in the form of 12 bit words which can be transmitted singly or in groups and can accommodate all commands and data transmissions for these devices.

Figure 2:
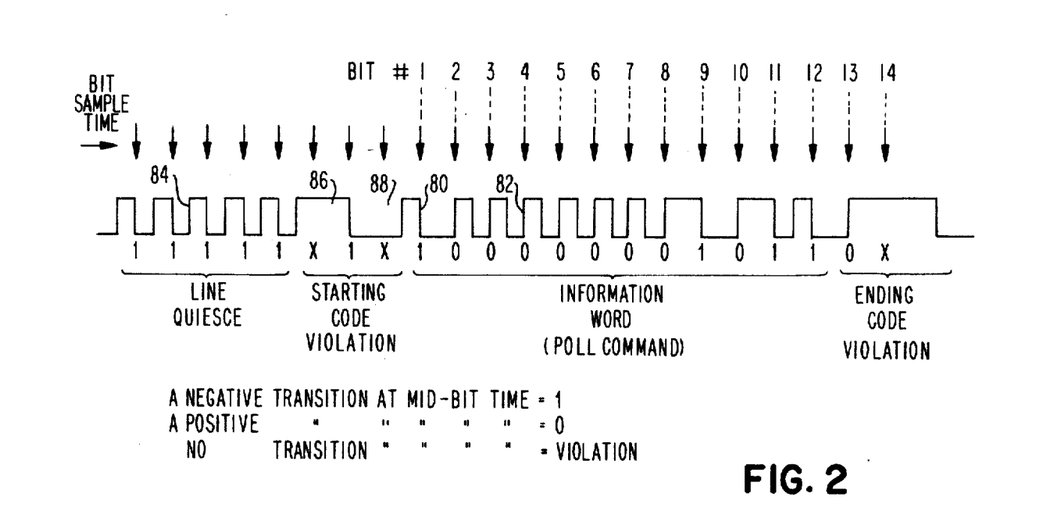
FIG. 2 shows the transmission format and a command word layout for a general poll command word from the controller of FIG. 1 to the display unit of FIG. 3.

FIG. 2 shows a preferred signal configuration for this purpose. As shown in that figure, a transition at mid-bit time signifies a valid bit, a negative going transition such as at 80 signifying a "1" and a positive going transition such as at 82 signifying a "0". Unless chained to a previous word, the data word is preceded by a plurality of line quiescence pulses 84 followed by a code violation recognized by the fact that there is no mid-bit transition during the time shown at 86, 88. Between these code violations there is a transition indicative of a "1" and following this violation period there is another indication of a "1" which constitutes bit #1 time. Mid-bit time 13 signifies the beginning of an ending code violation which can be followed by another word or a return to the line quiescence signal 84.

DISPLAY STATION ORGANIZATION

Figure 3:
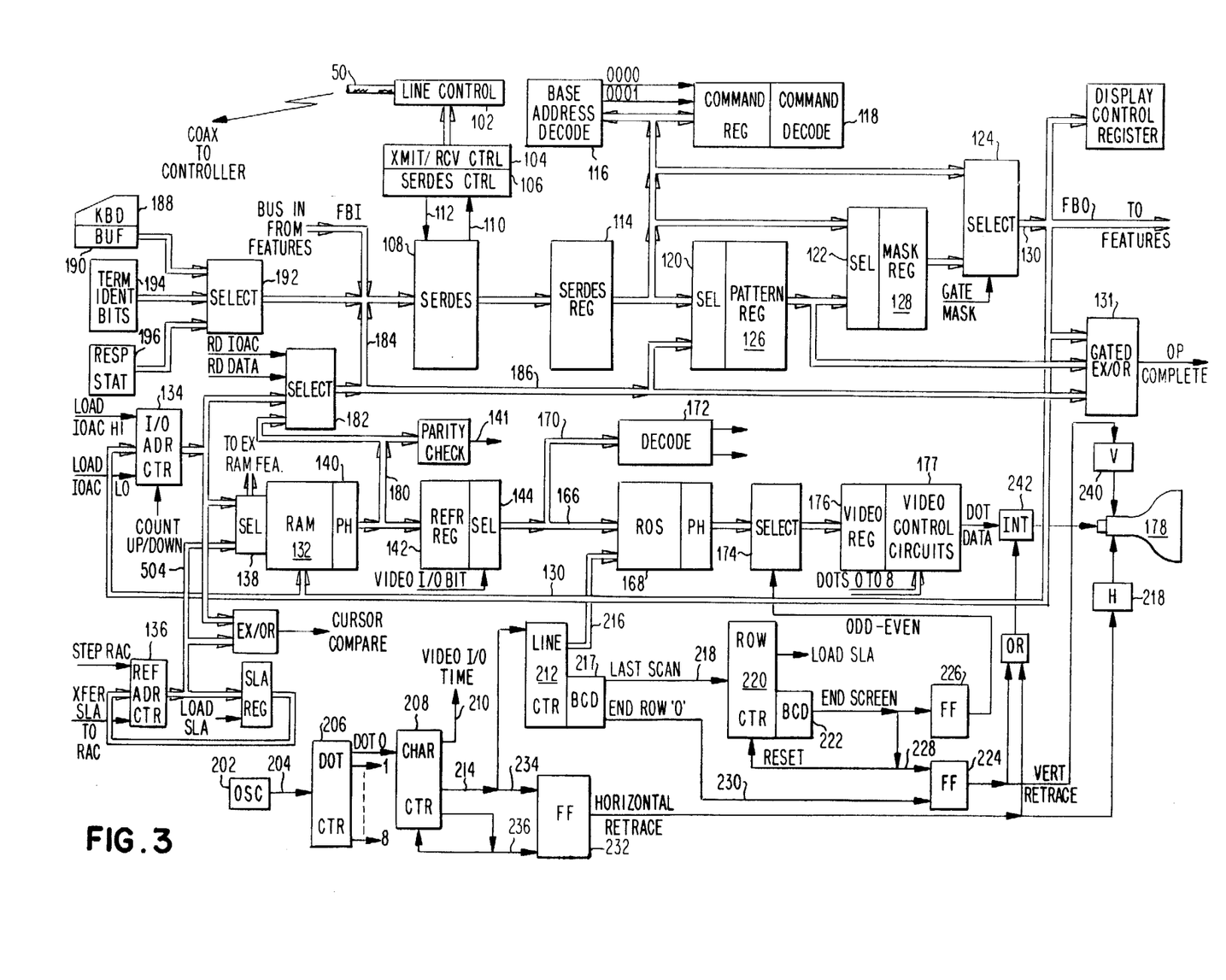
FIG. 3 is an overall diagram of the base and keyboard portions of the display units of FIG. 1, in simplified form for clarity of illustration and to emphasize the operative relation of the parts.

FIG. 3 shows a block diagram of the major keyboard and display head components of a typical keyboard display station in accordance with the invention, such as, for example, the display station 58 of FIG. 1. The display head of station 58 will be referred to as a "base unit" to distinguish it from the "features" it supports. The coaxial cable 50 of FIG. 1 is shown in FIG. 3 as connected to a line control module 102 which in turn is connected to a transmit/receive control 104 and, under supervision of a series/deserializer control 106, to a serial/parallel converter 108. Converter 108 functions as a serializer/deserializer and will be referred to hereafter as "serdes". Serdes 108 transmits and receives 12 bit patterns to and from line 50 via connections 110, 112. These correspond to bit numers 1 through 12 of the bir pattern organization illustrated in FIG. 2. However, serdes 108 passes only 10 bits of the 12 to the serdes register 114. These 10 bits include 8 data or command bits, one bit to indicate whether these constitute a command or data, and one parity bit. The first four bits of a command are in fact the base address (that is, the address of the basic keyboard-display unit as opposed to features such as the light pen or card reader, etc.). These are fed to and decoded by a base address decoder 116. The remainder of the command is fed to a command register/command decode organization 118 described in greater detail hereinafter.

If, instead, the received byte is a data byte, it is gated by selection circuitry 120, 122, 124 into one of three main paths: to a pattern register 126, a mask register 128 or a "bus out" path 130. Bus out 130 connects to a random address memory (RAM) 132 and also to one of the two addressing mechanisms for RAM 132, I/O address counter 134. The other addressing means for RAM 132 comprises refresh address counter 136. Addresses from counters 134 and 136 are fed in alternation via select circuitry 138 for addressing RAM 132 for input/output and refresh operations respectively. The resulting data read from RAM 132 is stored temporarily in polarity hold register 140. The data flow for refresh is from register 140 to refresh register 142 from which data bytes are gated one at a time by selection circuitry 144 to constitute address bytes applied via connection 166 to a read only storage (ROS) character generator 168. At the same time, however, the information read from refresh register 142 is applied also via 170 to decoder 172.

As will be described in greater detail hereinafter, one of the functions of decoder 172 is to recognize whether or not the information so received is to be displayed. If so, the output of character generator 168 is gated via select circuitry 174 to a video register 176, where it is operated upon by video control circuits 177 to produce display dot data for delivery to a cathode ray tube 178 for display.

Another path from RAM 132 is via 180 and selector circuit 182 either via 184 back to serdes 108, or via 186 to pattern register 126. These paths are utilized for a read operation back to the controller via serdes 108, or in a insert operation wherein data from RAM 132 is cycled through registers 126 and 128, both of which operations will be described in greater detail hereinafter.

FIG. 3 also shows elements for transmitting information to the controller. One of these is a keyboard 188, which is a usual, but optional addition to the base unit. Keystroke information in "Scan Code" form is buffered in keyboard buffer 190 until the proper time for being transmitted through select gate 192 for transmission via coax 50 to the controller. Another input element is a bus in form features, FBI. Other information to be sent to the controller are terminal identity bits from register 194 and response status information from register 196.

By operation of these elements, flow of information from the controller to the display station or to one of its features, flow from the display station or its keyboard or one of the display station features to the controller, and operations within the display station are carried out. One of the operations within the display station is a display refresh operation for generating and maintaining a visual display on the face of the cathode ray tube 178. Operation of the display station elements for this purpose will now be described.

DISPLAY GENERATION AND REFRESH

In the illustrated embodiment, information is displayed on the face of cathode ray tube 178 in the form of an interlaced raster pattern of lines of dots in patterns defined by the output of character generator 168 so as to present dot patterns on the face of the cathode ray tube representative of alpha-numeric characters and other symbols arranged horizontally in rows. Within a row of characters a horizontal raster line constitutes a "slice" of each character in the row in a well known manner. A fundamental operation is to regenerate the interlaced raster to display information corresponding to displayable information in ROS 168 repetitively on the order or 30 times per second, so as to generate a flicker-free display.

The display head automatically constructs a raster pattern, reads any data stored in RAM 132 and generates the dot patterns for these data characters in their corresponding positions on the screen. This operation goes on as long as the head is powered on; at any time the controller may write to or read from the head via the coax cable, independent of the refresh operations.

Oscillator 202 provides a 14 MHz OSC pulse train 204 to shift a Dot Counter 206. Dot Counter 206 is a ring counter consisting of nine flip-flops, shifted by OSC pulses 204. The nine outputs of 206 correspond to the nine dot times making up the width of a character. Dot Counter 206 is the major timing clock in the Display Station of FIG. 3, used in all data handling operations for synch and timing.

Character Position Counter 208 is a seven bit counter incremented by Dot 0 of counter 206, i.e., each discrete character width. Counter 208 counts to 80 before initiating a Horizontal Retrace. During retrace, counter 208 continues to count up to 96 character positions before ending the Horizontal Retrace operation.

Thus each scan line covers character widths numbered 1-80, and each Horizontal Retrace occurs between character times 81 and 96. Character time 96 causes the counter 208 to reset. The beam CRT 178 is blanked during retrace.

The lowest order bit 210 of character position counter 208 (=1 character time) is a major timing line used in I/O refresh multiplexing addressing of RAM 132. When this bit is active the display is in "Video" time, during which the RAM 132 content is read out for refreshing the display. When the bit on line 210 is inactive ("I/O Time"), the RAM 132 is at the disposal of the Read/Write I/O signals from the controller. Thus 50% of RAM time is available for I/O operations.

Line Counter 212 is a three bit counter, incremented by "Character 80", signal on line 214 from the character counter, so that counter 212 advances at the end of each scan line. The output 216 (Binary 4, 2, 1,) is a line count ascending from 000 to 111, counting eight lines per row in each odd-even field of the display. This output is used along with the eight bit character code received via 166 from RAM 132 to address ROS 168 selecting one nine dot "slice" of a character for display. Decoder 217 detects the end of the eighth line count, and activates "Last Scan" line 218 to increment the Row Counter 220. This line also resets the line counter 212.

Optionally "Last Scan" signal on line 218 can initiate a vertical skip signal which provides inter-Row spacing. The vertical skip signal can be in the form of a staircase signal which is added to the vertical deflection signal to provide a space in the raster between each character row. Circuits for providing a periodic space between groups of raster lines are well known, for example as shown in U.S. Pat. Nos. 3,423,749 and 3,479,605, and thus are omitted from the drawing.

As aforesaid, Row Counter 220 is incremented at the last line of each row by the "Last Scan" on line 218. The outputs of counter 220 are decoded at 222 to indicate that the last row of the current field has been completed. This signal is "End Screen", which resets the Row Counter 220, starts a Vertical Retrace operation (Row 0) via flip-flop (FF) 224, and toggles the current odd-even field flip-flop (FF) 226.

As aforesaid, one complete screenful of rows, each row having eight lines, is a "field". As the end of the first field (ODD), 'End Screen' toggles FF 226 and causes the EVEN field to start after Vertical Retrace. This even field will also have eight lines per row for the whole screen, but will commence one line space lower than the odd field, giving interlacing of the two fields.

The persistence of the phosphor in the screen of CRT 178 will retain the odd field information, keeping it visible until the even field is interlaced. Thus all rows appear to have 16 scan lines, and there is no flicker of the displayed information. "Vertical Retrace" time is measured as the time between set of FF 224 by the End Screen signal at 228, and the reset of FF 224 via a signal on line 230. Similarly, Horizontal Retrace time is measured by FF 232, which is set by "character 80" time signal on line 234 and is reset by "character 96" time signal on line 236, both derived from character counter 208.

The continued effect of all these components is to place a raster on the screen of CRT 178 under the control of the horizontal and vertical sweep integrators 218, 240 and beam current control circuits 242 of the display.

EXAMPLE OF DATA MODIFICATION BY BASE UNIT

The remote controller can issue search commands to search forward or backward for specified data in R/W RAM 132 of the base unit. This is accomplished by the provision of pattern register 126 and mask register 128 whereby a search for pattern under mask can be conducted. To perform such a search, the controller loads a mask in register 128 with a byte in which 1's represent bit positions which are to be considered in the search and 0's represent bit positions which are not relevant to the search. This is accomplished by a Load Mask command addressed to the base. The controller also loads data into pattern register 126 having 1's and 0's in the bit positions which characterize the kind of data to be searched for. The controller also sets the I/O address counter 134 to the desired position for starting the search and issues a command to search forward or backward from that address. This results in incrementing counter 134 forward or backward and gating the results read from RAM 132 via busses 180 and 186 to a gated comparison circuit 131 where a match test is made between the byte of data read from 132 to 131 with the byte of data in pattern register 126. At the same time, the contents of mask register 128 are read via 124 and 130 to the gating portion of circuit 131. When all of the bits which have been designated as significant by 1's in the mask have produced a match in gated (EX/OR) comparison circuit 131, a search complete (OP COMPLETE) signal issues from circuit 131 to Status Register 196. This stops the incrementing of I/O address counter 134 and provides a response via line Select 192, Serdes 108 and line 50 to the controller that the search is complete.

By having a search under mask capability instead of mere pattern match, searches of greater complexity can be performed in one operation than would otherwise be the case. This decreases the traffic on line 50 and reduces the burden on the remote controller.

This pattern-mask facility can be used in a number of ways. One is in an "insert" operation wherein it is necessary to increment the position of data in storage 132 to make room for a character to be inserted. Before carrying out such an operation, it is desired to check for a "null" in the field concerned, to which the data in the storage can be moved. This can be accomplished by setting the mask register 128 to all 1's and inserting the pattern of a null, all 0's, in pattern register 126. If a null is found at an address (determined by reading the I/O address counter) which is less than the address of the next field marker attribute, the insert operation can proceed. At this point, a different use of registers 126 and 128 comes into play. Gates 120, 122 are operated to place registers 126 and 128 in series. The byte representing the character to be inserted is placed in register 128 by the controller. Then I/O counter 134 is set to the address to be modified, and the byte currently at that address is read via 180, select gate 182, and connection 186 to register 126. Thereupon, the new byte in register 128 is written via 130 and into the position of RAM storage 132 at which I/O address counter 134 stands (the former location of the displaced byte). The displaced byte is now transferred from register 126 to register 128 to make room for the next character from storage 132. The I/O address counter 134 is incremented and the process is repeated until the null is reached and replaced by the final displaced character.

If it is desired to search for all "attributes" (field marking non-display control bytes), mask register 128 is loaded with "11000000". This is because attributes begin with 1's in the two high order positions and the search is for any attribute and therefore the remaining bits are not of interest. Alternatively, a search can be made for a certain kind of field marking attribute (e.g. high intensity, protected, etc.). In this case the mask register is set to "1" in bit positions 1 and 2 to indicate an attribute and in the other bit positions which characterize the kind of field searched for. This operation is useful in executing a "tab" command, for example.

Other examples of a search under mask could be for all numeric characters or for all alphabetic characters or all punctuation, etc. Accordingly, commands for various kinds of word processing and editing can be executed in a facile manner and a saving of controller time and controller code.

RELATIONSHIP OF FEATURES TO BASE UNIT

As thus far described, the base unit shown in FIG. 3 has a major role in displaying data and also has data handling roles, for example, receiving and checking data, carrying out a variety of commands having to do with read/write storage management (setting memory I/O address counter, carrying out searches), and providing keyboard input to the system. These operations result in base status conditions which have a role in the relationship between the base unit (including the keyboard) and the features supported by that base unit.

Figure 4:
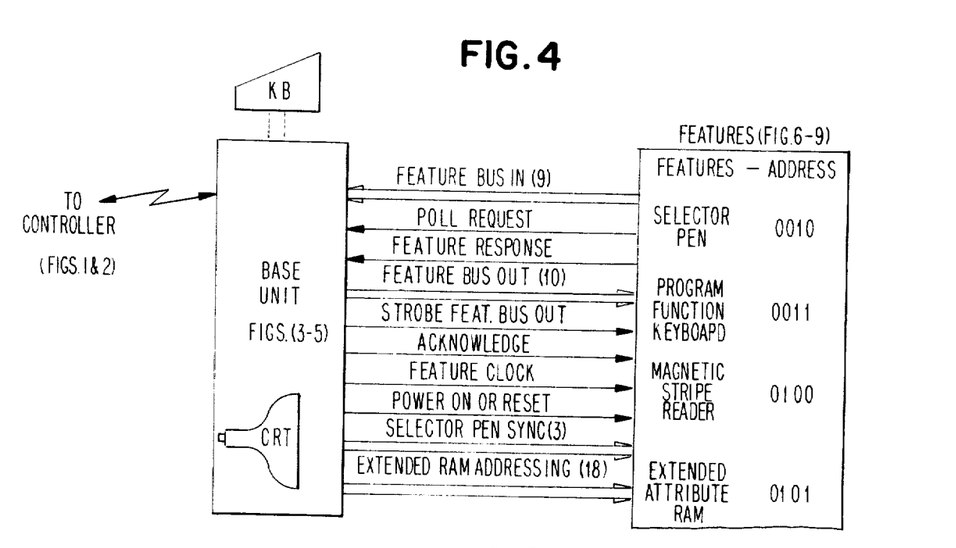
FIG. 4 shows in diagrammatic form the relationship between the base unit of FIG. 3 and the feature units attachable thereto in accordance with the invention.

FIG. 4 illustrates the way features are coupled to the base to form a terminal unit therewith. The left hand portion of FIG. 4 represents the elements shown in FIG. 3, and the right hand portion of FIG. 4 represents features supported by, i.e., attached to, the base unit. The features have addresses 0010 through 1111, forming a continuation of the addressing scheme, 0000 and 0001, of the base unit. Thus, although only four features are indicated in FIG. 4, up to fourteen individually addressable features could be accommodated. The four examples shown illustrate a variety of relationships to the base unit. The Selector Pen, address 0010 and the Extended Attribute RAM, address 0101 are synchronized with the base unit display, as will be explained. The Program Function Keyboard, address 0011 and the Magnetic Stripe Reader, address 0100, are more independent. However, all of the features shown follow a common discipline in the priority scheme of the display station, and have data interfaces with the base unit, and through it, to the controller of the system. They are connected to the base unit by Feature Bus Out (FBO)

for receipt of commands and data, Feature Bus In (FBI) for responses, and various control lines to be described.

Figure 5:
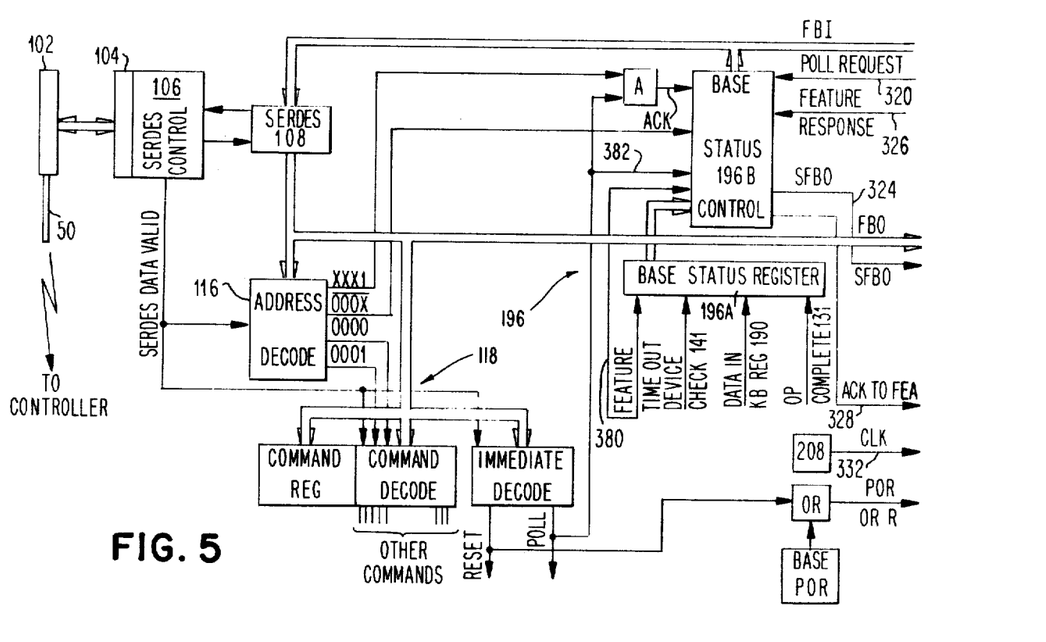
FIG. 5 shows control elements of FIG. 3 in greater detail, including inputs and outputs thereof as represented in FIG. 4.
Figure 6:
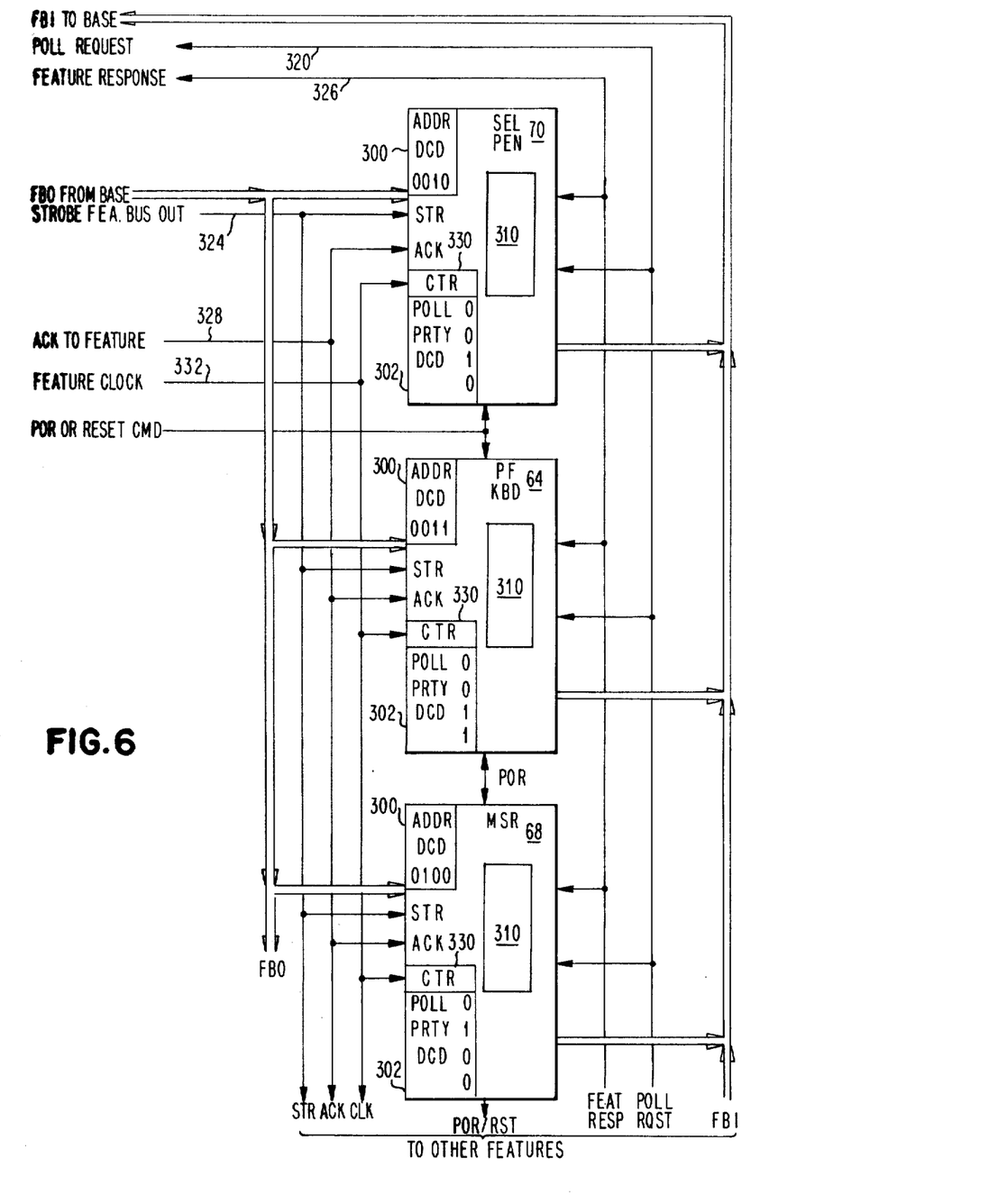
FIG. 6 shows in diagrammatic form a number of feature units corresponding to right hand portions of FIG. 4.

FIGS. 5 and 6 show elements in the base unit and the features, respectively which control this interface. FIG. 5 is an elaboration of portions of FIG. 3, to more clearly show these elements of the base unit. Status element 196 of FIG. 3 is shown in greater detail in FIG. 5 to comprise a base status control 196B. Base status register 196A provides information about the operation of the base unit pertinent to priorities between the base and features. Among these are, for example, a parity error as detected at 141, FIG. 3, an operation complete such as a pattern under mask match indicated by a signal at the output of element 131, FIG. 3, or the presence of data in the register 190 of keyboard 188. These signals are shown as inputs to BASE STATUS REGISTER 196A portion of the detail of element 196 in FIG. 5. A factor of still higher importance is Feature Time Out 380 indicating a failure of a feature to respond properly to a controller command.

All communications are initiated by the controller. A poll command is transmitted to the base unit or to one of the features according to a priority arrangement to be described. A write command is addressed to the base unit or a feature. A read command addressed to the base or a feature causes the same to send data to the controller. Thus, commands may be general, or specifically addressed to the base unit itself or to one of the features attached to the base. The first part of the command byte contains the address to which the command is being sent.

FIG. 2 shows the form of a poll command. Bit #11 is a "1", indicating a command, and #'s 6, 7, 8, and 9 are 0001 thereby indicating a Poll. A poll command is "immediate" and, if the Serdes control 106 indicates that the bits are valid, is transmitted to Base Status Control (196, FIG. 3; 196A and 196B in FIG. 5) for response in accordance with the following priorities:

| LEVEL | STATUS TYPE |
|---|---|
| 0 | Feature time Out |
| 1 | POR Complete |
| 2 | Base Status |
| 3 | Keyboard Scan Code |
| 4 | Other Feature Status |

It will be noted that priority level 4 "Other Feature Status". The features share this level, as will now be described.

Figure 8:
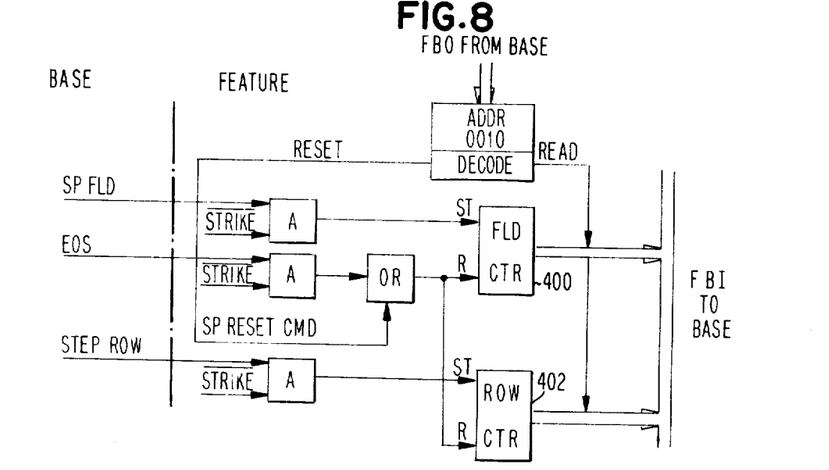
FIG. 8 is a diagrammatic showing of elements of the selector pen feature.
Figure 9:
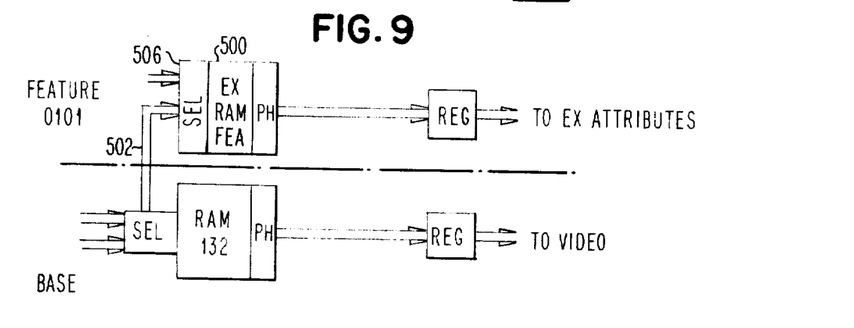
FIG. 9 is a diagrammatic showing of the relationship of the extended attribute RAM feature to the base unit RAM.

Turning to FIG. 6, each feature has dual addressing means, an address decoder 300 for responding to read and write commands from the controller via FBO from the base unit, and a poll priority counter decoder 302 for gating a poll command from FBO to the various features in an orderly manner. Each feature also has command decode and execution elements 310 and data registers appropriate to its function. Examples are shown in FIGS. 8 and 9.

A Poll Request Line 320 is provided which is common to all of the features. This line is activated by a feature only when it has status to transmit. Once the Poll Request Line has been activated by a particular feature, all other features are prevented from responding to a poll on FBO. Another common control line is Strobe Feature Bus Out line 324. This line is the control whereby the poll is passed from the base unit to the features. Upon detecting a signal on this line and decoding the poll command on FBO, the feature that has activated the poll request line 320 will place its address and status on the Feature Bus In and activate the Feature Response line 326. When the base unit control 196B deactivates the Strobe Feature Bus Out line 324, the feature will deactivate the Feature Response line 326 and remove its address and status from the Feature Bus In. If no transmit check occurs on the feature status transmission, the controller will set the ACK bit #5 "on" in the next poll to the base. The base will then activate the common ACK line 328 and this will cause the feature to deactivate the Poll Request line 320. If the ACK bit does not accompany the next poll sent to the base, the feature will re-transmit its status while maintaining the poll request line active.

Each feature is assigned a unique time slot during which it can activate poll request so that multiple features will not attempt to activate the poll request line 320 simultaneously. Each feature contains a 4-bit priority counter 330 which is stepped with the positive transition of a clock line from the base unit. A particular feature will be allowed to present a poll request during not clock time when its counter is equal to a pre-defined value, its address. Once the poll request line has been activated by a particular feature, all of the counters 330 are held reset. A feature must inhibit step of its priority counter and not activate the poll request line when the ACK line 328 is active. As aforesaid, the priority of each feature is set by the feature address. For example, the Selector Pen address is 0010 and therefore has a higher priority than the Magnetic Stripe Reader which has an address of 0100.

Since the features are directly addressable by the controller, the "active" state of the poll request line does not preclude commands other than poll from being transmitted to any feature.

Figure 7:
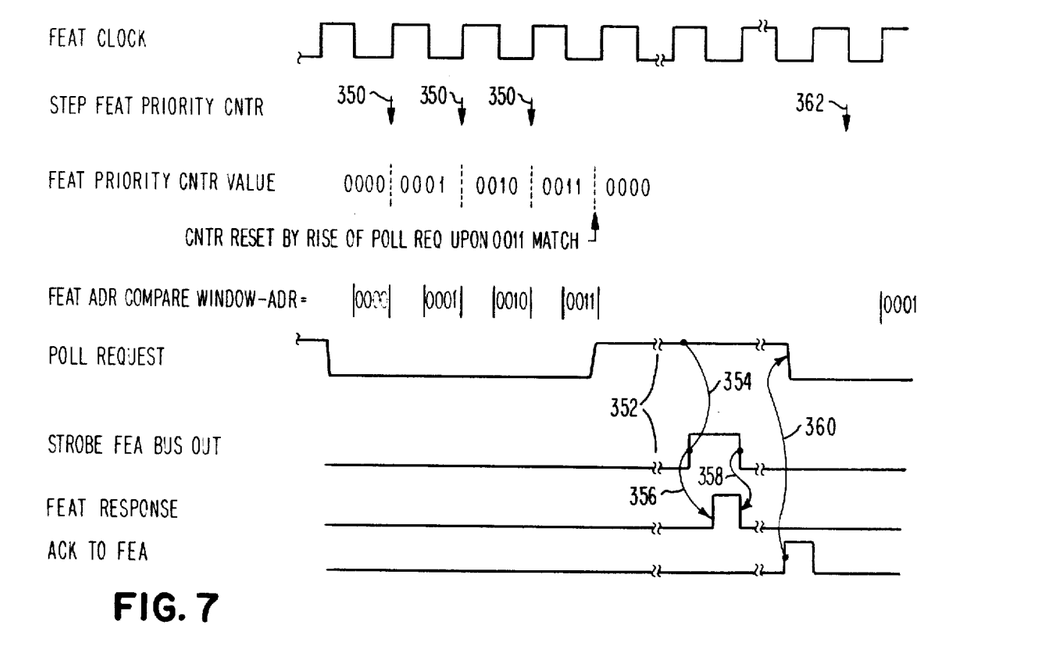
FIG. 7 is a timing diagram illustrative of operations of the apparatus of FIGS. 5 and 6.

FIG. 7 is illustrative of this operation. Feature clock is taken from the base unit character counter 208 (FIGS. 3 and 5). The up transition of this clock steps all of the feature counters 330 unless they are held reset by the Poll Request line 320 having been activated by a feature.

For example, the counters are stepped as indicated at times 350 until their count matches the address of a feature having status to transmit, in this case the Program Function Keyboard 64 having address 0011. This match is made during not clock time, as shown. Thereupon, feature 64 raises the poll request line and blocks all other features. As indicated by the breaks 352, this condition persists until the pole request is honored. The base unit Base Status Control 196B (FIG. 5), having detected Poll Request, raises Strobe Feature Bus Out line 324 at the time of the next Poll to be passed to the features. This is at the time of the next poll from the controller when the base unit has no higher priority response, that is at priority level 4.

At that time, as indicated at 354, the Base Status Control 196B raises Strobe Feature Out, which then gates the Poll command standing on FBO to the feature 64 whose address, 0011, had raised Poll Request line 320.

This causes feature 64 to respond to the controller by placing its address in the address field (Bits #2, 3, 4, and 5) in a Poll response on FBI, as indicated at 356, a condition which it maintains until fall of Strobe Feature Bus Out, at 358. When the controller acknowledges the response by an "acknowledge" address to feature 0011, the feature deactivates Poll Request, as shown at 360, and the feature counters are thus no longer held reset, and can start counting again as indicated at 362. If other features have status, the highest order one (lowest address) will produce a match when the counters reach its count.

As a general rule, each feature replicates the general elements of a base unit. Each has an address decoder, command decoder and data utilization apparatus, even if only a data register or other simple device. Each can be addressed directly by the controller but responds to a Poll only by and upon a Strobe Feature Bus Out command by the base unit. Moreover, the base unit monitors the response of the feature as to timeliness. If a feature which has raised Poll Request does not respond to a Poll or if a command or data to a specific (addressed) feature from the controller does not elicit a response within a predetermined time, the Base Status Control 196B will set "Feature Error" in Base Status Register 196A, via Feature Time Out line 380. This has the highest base unit priority, priority level 0. To accomplish this, Base Status Control 196B has a timer which it starts when there is a Poll from the controller which occurs with a Poll Request standing from a feature. That is, there is, a signal on line 382 for Immediate Decode which is a true poll (not an ACK signal) and there is a request signal on line 320. A Feature response (line 326) will reset the timer; if it is not reset before it times out, a signal on line 380 will result.

The timer is also started by a command addressed to a feature. This is signalled by a command address which is not to the base, i.e. not 000X and not decodable as a Poll. Thus a "not 000X" signal on line 384 from Decode 116, and not one on line 382 starts the timer. Again, a response (line 326) will stop it.

ACK into control 196B can be to the base or to a feature. It has the form of a Poll command but bits 2–5 are XXX1. If there has been a feature response (326), it is to that feature, and is transmitted on line 328. This is seen in FIG. 7.

Some features utilize additional signals from the base unit for their operation. Referring to FIG. 8, the Selector Pen feature 70 uses a combination of Selector Pen Field (SP FLD) (from attribute decoder 172, FIG. 3) and End of Screen (EOS) and STEP ROW signals (from 222, FIG. 3 and 220, FIG. 3) and pen "strike" signals to record the field number and row location of the pen strike (detected CRT light pulse) in counters 400 and 402. The contents of these counters can be read by the controller by a read command on FBO, addressed to feature 0010, and then the counters can be reset by another such direct command. Of course, the feature also has the poll response capability (not shown in FIG. 8, for simplicity) above described by which it signals the controller that it has status, in this case a strike field and row count.

FIG. 9 shows another way in which a feature can have close coupling to the base unit. In this case, the feature has a R/W storage, RAM 500 which takes its "video" read addressing via 502 from the main base unit refresh address counter while having its own I/O address count via 506. In either case, it can receive data from Feature Bus Out in the same manner as any other feature. While it is shown as an attribute buffer for use similarly to but with greater versatility than the base unit two-bit decoder 172, it could be used for any purpose and would not have to be synchronized with the refresh of the base unit. Thus, it could be readable to FBO in the same manner as RAM 132.

FIG. 3 shows details not needed in every feature. However, the general rule is that the base unit and the features treat transmissions from and to the controller in the same way. In fact, a "feature" unit could be another display terminal or printer. In transmissions from the controller, bit 11 being a "1" signifies a command and bit 11 be a "0" signifies data to be gated from and to the various elements in accordance with that command.

Accordingly, while the invention has been particularly shown and described with reference to a preferred embodiment thereof, it will be understood by those skilled in the art that various changes in form and detail may be made therein without departing from the spirit and scope of the invention.

What is claimed is:

1. A display terminal including a base unit and feature units electrically attached to said base unit,
   said base unit comprising a display and being characterized by having, within said base unit,:
   an input-output interface for connection to a controller external to said terminal,
   a bus-out and a bus-in connected to the interface to receive commands and data from said controller and to transmit data to said controller,
   decoder means connected to said bus-out responsive to commands from the controller on said bus-out variously according to whether they are one of a plurality of classes, one of the classes being a general poll directed to the base and feature units in common, and another of said classes being characterized by containing a base or feature address,
   base status means to indicate operative conditions in said base unit,
   and base priority means responsive to said base status means and to status of said feature units, said priority means acting to register said operative conditions for first establishing an order of priority of resulting status within said base unit and, as a function of that status, to proceed in the absence of that base status to examine status of said feature units as a group, said bus-out and bus-in extending to said feature units to comprise electrical attachment of said base unit thereto.

2. A display terminal as set forth in claim 1, wherein said feature units comprise:
   input and output interfaces connected to said base unit bus-out and bus-in respectively for communication with the base unit input-output interface and through it with said controller,
   means in said feature units responsive to commands on the bus-out containing the address of a feature unit to decode and execute the command in the addressed feature unit, and
   feature priority means responsive to the base priority means upon said examination of said feature units as a group to effect transmission selectively from said feature units to the bus-in in response to a general poll command on said bus-out.

3. A display terminal as set forth in claim 1, wherein said terminal comprises means responsive to said base priority means and to said decoder means to effect transmissions selectively from said base unit and said feature units to said bus-in in response to a said general poll command received by said decoder means on said bus-out from said control via said interface.

4. A display terminal as set forth in claim 1 or claim 3 wherein said feature units each comprise:

input and output interfaces connected to said base unit bus-out and bus-in respectively for communication with the base unit input-output interface and through it with said controller, means in said feature units responsive to commands on the bus-out containing the address of a feature unit to decode and execute the command in the addressed feature unit, and feature priority means in said feature units operative to inhibit response of all but one of said feature units at a time so as to resolve contention between said feature units when the status of said feature units as a group is examined, whereby feature unit response to a general poll command on said bus-out is subject to at least two levels of priority, base priority and priority between the feature units.

5. In a terminal unit for use in a display system comprising a base unit including a display and a keyboard, and feature units depending from said base unit to be connected in said system through said base unit and to be supervised by said base unit, said base unit including:

serializer-deserializer input-output means for connection to a controller external to said terminal unit via a serial bit transmission means between said terminal unit and said controller;

the improvement which comprises:

a bus-out and a bus-in in said base unit connected to said input-output means for transmission of information between the input-output means and each of the feature units via respective bus connections with the same;

base command decode and execution means in said base unit connected to said bus-out and operative to distinguish between addressed commands and general poll commands;

data storage and utilization means in said base unit connected between said bus-out and said bus-in and responsive to said base command decode and execution means;

said base command execution means being operative as a base selector means for directing data between said bus-out and said data storage and utilization means, and from said storage and utilization means to said bus-in, base status means in said base unit including base priority means responsive to elements of said base unit including said data storage and utilization means and said keyboard for signalling status of the base unit to said bus-in, said base priority means further including feature priority examining means connected to said feature units; and keyboard selector means including keyboard status means within said base unit responsive to the present status of said keyboard for connecting said keyboard to the bus-in;

said base priority means being connected to said base command decode and execution means and being responsive to said status of the base including keyboard status for processing a poll command received by said base command decode and execution means on said bus-out so as to rank transmissions of said base unit, including said keyboard, and said feature units, in decreasing order of priority, to said bus-in.

6. A terminal unit as set forth in claim 5, wherein said feature units have information interfaces connected to the bus-in and bus-out and feature priority controls connected to the base priority means, and include feature command decoder and execution means, feature address decoder means, data storage and utilization means and feature status means.

7. A terminal unit as set forth in claim 6 wherein, said feature priority means includes ranking means for setting the relative priorities of said feature units.

8. A terminal unit in accordance with claim 7 wherein, the respective rank of said feature unit constitutes the address of said feature unit.

9. A terminal unit in accordance with claim 8, wherein said priority means passes a poll from said controller to said feature units in accordance with said rank, but said controller can address an individual feature unit by its address in any order.

10. A terminal unit in accordance with claim 5, wherein at least one of said feature units includes, address decoder means, command decoder means, data utilization means, and data transmission means.

* * * * *